United States Patent
He et al.

(10) Patent No.: US 9,411,480 B2
(45) Date of Patent: Aug. 9, 2016

(54) CONTROLLING METHOD AND TOUCH PANEL USING THE SAME FOR REDUCING RESOLUTION REQUIREMENT OF ANALOG-DIGITAL CONVERTER

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 64 days.

(21) Appl. No.: 14/513,872

(22) Filed: Oct. 14, 2014

(65) Prior Publication Data
US 2016/0103514 A1   Apr. 14, 2016

(51) Int. Cl.
G06F 3/044 (2006.01)

(52) U.S. Cl.
CPC ....................................... *G06F 3/044* (2013.01)

(58) Field of Classification Search
CPC ................... G06F 3/044; G06F 3/041; G06F 2203/04104; G06F 3/03547
See application file for complete search history.

(56) References Cited

U.S. PATENT DOCUMENTS

| | | | |
|---|---|---|---|
| 2010/0042346 A1* | 2/2010 | Kuang | G01R 27/2605 702/65 |
| 2010/0085322 A1* | 4/2010 | Mamba | G06F 3/044 345/173 |
| 2010/0328252 A1* | 12/2010 | Chang | G06F 3/044 345/174 |
| 2011/0157072 A1* | 6/2011 | Chang | G06F 3/0416 345/174 |
| 2012/0062247 A1* | 3/2012 | Chang | G01R 31/2829 324/679 |
| 2013/0038570 A1* | 2/2013 | Seo | G06F 3/0416 345/174 |
| 2014/0028626 A1* | 1/2014 | Maeda | G06F 3/0416 345/174 |
| 2014/0092050 A1* | 4/2014 | Tan | G06F 3/0416 345/174 |
| 2015/0035794 A1* | 2/2015 | Zhitomirskiy | G06F 3/044 345/174 |

FOREIGN PATENT DOCUMENTS

| TW | 387080 B | 4/2000 |
|---|---|---|
| WO | 2005057388 A1 | 6/2005 |

* cited by examiner

*Primary Examiner* — Lun-Yi Lao
*Assistant Examiner* — Elliot Deaderick
(74) *Attorney, Agent, or Firm* — Locke Lord LLP; Tim Tingkang Xia, Esq.

(57) ABSTRACT

The touch panel includes a panel capacitor, a first circuit, a first capacitor, a second circuit and a controlling circuit. The first capacitor is coupled to the panel capacitor. The first circuit transmits a scan signal to the panel capacitor. The second circuit transmits an inverting signal to the first capacitor. The inverting signal is synchronized with the scan signal, a frequency of the inverting signal is identical to a frequency of the scan signal, and the inverting signal is phase-inverted from the scan signal. The controlling circuit outputs a touch signal in response to a voltage at a terminal of the panel capacitor, in which the touch signal is configured to estimate a capacitance of the panel capacitor.

10 Claims, 5 Drawing Sheets

CONTROLLING METHOD AND TOUCH PANEL USING THE SAME FOR REDUCING RESOLUTION REQUIREMENT OF ANALOG-DIGITAL CONVERTER

BACKGROUND

1. Field of Invention

The present invention relates to a touch panel. More particularly, the present invention relates to a controlling method and a touch panel in which a base capacitance of a panel capacitor is equivalently decreased.

2. Description of Related Art

With the rapid development of technology, electronic devices such as notebooks, mobile phones or portable multimedia players usually adopt touch panels as a human-machine interface. The touch panels are generally categorized into capacitive touch panels and resistive touch panels. The capacitive touch panels are operated by approaching or touching the touch panels with a finger or a conductive material to change capacitances of the touch panels. When the variation in capacitances is detected, the approached or touched location can be identified to further execute a predetermined operation corresponding to the foregoing approached or touched location.

FIG. 1 illustrates a conventional touch panel. As shown in FIG. 1, a conventional touch panel includes a plurality of panel capacitors (e.g. panel capacitors C11-C15), and the panel capacitors are disposed at the intersections of the columns X1~X8 and the rows Y1~Y8. The touch panel scans the panel capacities on the rows and the columns to obtain the capacitances of the panel capacitors. Every capacitance includes two parts, in which the first part is a base capacitance representing a capacitance without touching, and the second part is a capacitance variance generated by a touch.

In general, a signal corresponding to the capacitance will be converted into digital data by an analog digital converter (ADC). Obtaining the capacitances at different time points and calculating the variance of the capacitances can acquire a touched position. However, a resolution of the ADC is required to be high when the base capacitance is large and the capacitance variance is relatively small. For example, if the base capacitance is 21.4 pF, the capacitance variance is 0.1 pF, and the capacitance variance is quantized into 256 levels, then the ADC has to recognize X levels, in which 256/X=0.1/21.4 (i.e. X=54784) so that the ADC is required to have 16 bits of resolution. Therefore, how to decrease a resolution requirement of the ADC is an issue concerned by people skilled in the art.

SUMMARY

To solve the above problems, the present invention provides a controlling method and a touch panel using the controlling method, in which the resolution requirement can be reduced.

An embodiment of the invention provides a touch panel. The touch panel includes a panel capacitor, a first circuit, a first capacitor, a second circuit and a controlling circuit. The first circuit is coupled to a first terminal of the panel capacitor, and configured to transmit a scan signal to the panel capacitor. A first terminal of the first capacitor is coupled to a second terminal of the panel capacitor. The second circuit is coupled to a second terminal of the first capacitor, and is configured to transmit an inverting signal to the first capacitor. The inverting signal is synchronized with the scan signal, a frequency of the inverting signal is identical to a frequency of the scan signal, and the inverting signal is phase-inverted from the scan signal. The controlling circuit is coupled to the second terminal of the panel capacitor, and is configured to output a touch signal in response to a voltage at the second terminal of the panel capacitor, in which the touch signal is configured to estimate a capacitance of the panel capacitor.

In one embodiment, the scan signal is a first pulse signal, and the first circuit raises the first pulse signal to a first reference voltage at a first time point. The inverting signal is a second pulse signal, and the second circuit controls the second pulse signal to drop to a second reference voltage at the first time point. The second reference voltage is lower than the first reference voltage.

In one embodiment the second circuit comprises a first switch and a second switch. A first terminal of the first switch is coupled to the second terminal of the first capacitor, a second terminal of the first switch is coupled to the second reference voltage, and the first switch is controlled by a first phase signal. A first terminal of the second switch is coupled to the second terminal of the first capacitor, a second terminal of the second switch is coupled to a third reference voltage, and the second switch is controlled by a second phase signal. The second reference voltage is lower than the third reference voltage. The second phase signal is phase-inverted from the first phase signal, and the second phase signal is not overlapped with the first phase signal.

In one embodiment the first circuit comprises a third switch and a fourth switch. A first terminal of the third switch is coupled to the first reference voltage, a second terminal of the third switch is coupled to the first terminal of the panel capacitor, and the third switch is controlled by the first phase signal. A first terminal of the fourth switch is coupled to a fourth reference voltage, a second terminal of the fourth switch is coupled to the first terminal of the panel capacitor, and the fourth switch is controlled by the second phase signal. The fourth reference voltage is lower than the first reference voltage.

In one embodiment, the controlling circuit includes an integrator, a comparing circuit and a counter. An input terminal of the integrator is coupled to the second terminal of the panel capacitor, and an output terminal of the integrator outputs an integrating signal. An input terminal of the comparing circuit is coupled to an output terminal of the integrator. The comparing circuit determines if the integrating signal is higher than a comparing voltage to output a comparing signal according to the first phase signal. The counter is coupled to the comparing circuit and configured to count according to the comparing signal to generate the touch signal.

In one embodiment, the integrator includes an operational amplifier and a second capacitor. A first input terminal of the operational amplifier is coupled to a fifth reference voltage, and a second input terminal of the operational amplifier is coupled to the second terminal of the panel capacitor. A first terminal of the second capacitor is coupled to the second terminal of the panel capacitor, and a second terminal of the second capacitor is coupled to an output terminal of the operational amplifier.

In one embodiment the controlling circuit further includes a fifth switch, a third capacitor, and a sixth switch. A first terminal of the fifth switch is coupled to a sixth reference voltage, and the fifth switch is controlled by the first phase signal. A first terminal of the third capacitor is coupled to a ground terminal, and a second terminal of the third capacitor is coupled to a second terminal of the fifth switch. A first terminal of the sixth switch is coupled to the second terminal of the second capacitor, a second terminal of the sixth switch is coupled to the second terminal of the panel capacitor, and the sixth switch is controlled by the comparing signal.

In one embodiment, the touch panel is an in-cell touch panel.

In one embodiment, the scan signal has a scan voltage level, the inverting signal has an inverting voltage level, the panel capacitor has a base capacitance, and the first capacitor has a first capacitance. The product of the inverting voltage level and the first capacitance is less than the product of the scan voltage level and the base capacitance.

An embodiment of the invention provides a controlling method for a touch panel. The touch panel includes a panel capacitor and a first capacitor. The controlling method includes the following steps. A scan signal is provided to a first terminal of the panel capacitor, in which a second terminal of the panel capacitor is coupled to a first terminal of the first capacitor. An inverting signal is provided to a second terminal of the first capacitor. The inverting signal is synchronized with the scan signal, a frequency of the inverting signal is identical to a frequency of the scan signal, and the inverting signal is phase-inverted from the scan signal. A touch signal is outputted in response to a voltage at the second terminal of the panel capacitor, in which the touch signal is configured to estimate a capacitance of the panel capacitor.

In one embodiment, the scan signal is a first pulse signal, and the inverting signal is a second pulse signal. The controlling method further includes the following steps. The first pulse signal is raised to a first reference voltage at a first time point. The second pulse signal is controlled to drop to a second reference voltage at the first time point. The second reference voltage is lower than the first reference voltage.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
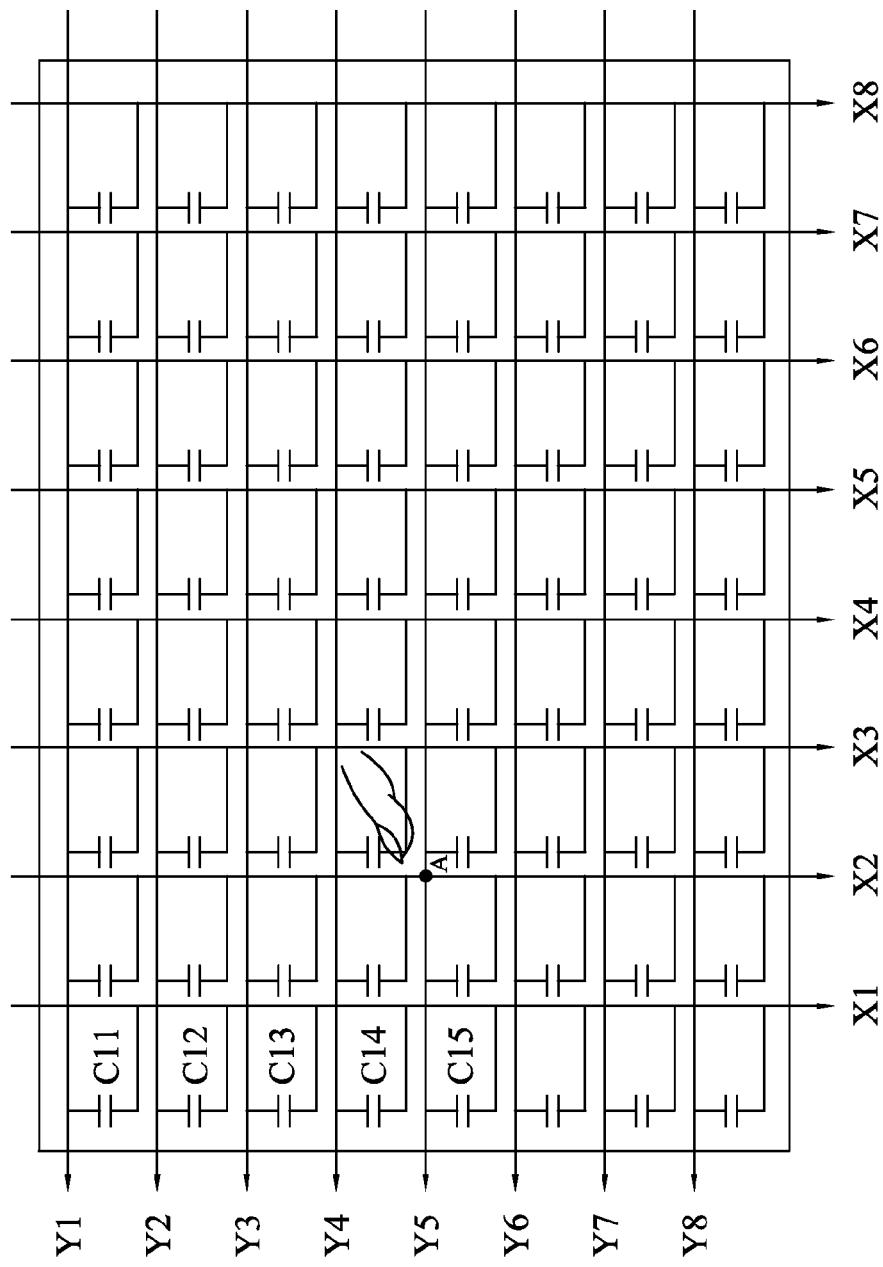
FIG. 1 illustrates a conventional touch panel.
Figure 2:
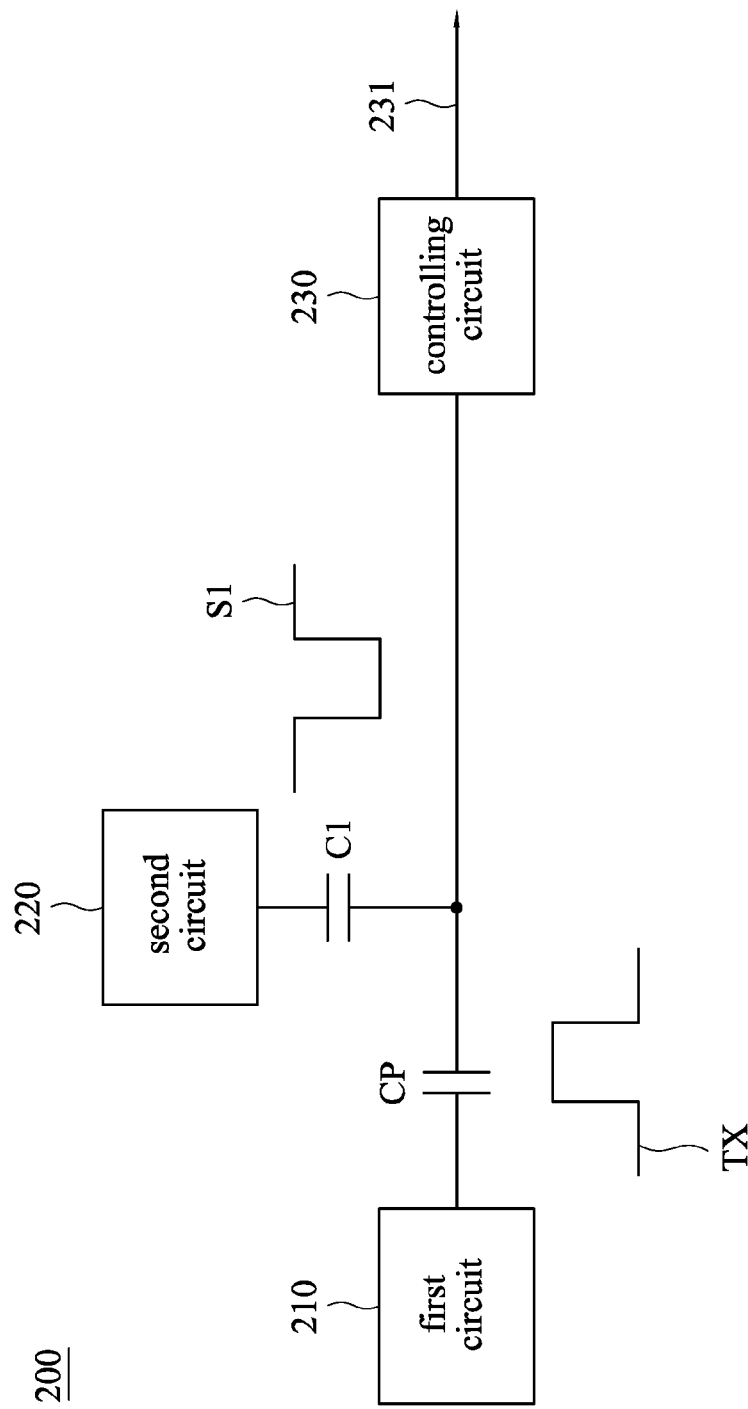
FIG. 2 is a schematic diagram illustrating a touch panel according to an embodiment.

FIG. 2 is a schematic diagram illustrating a touch panel according to an embodiment. A touch panel 200 includes a first circuit 210, a second circuit 220, a controlling circuit 230, a panel capacitor CP and a capacitor C1 (also referred to first capacitor). In one embodiment, the touch panel 200 is an in-cell touch panel, but the invention is not limited thereto. The first circuit 210 is coupled to a first terminal of the panel capacitor CP, a second terminal of the panel capacitor CP is coupled to a first terminal of the capacitor C1, and the second terminal of the capacitor C1 is coupled to the second circuit 220. The first circuit 210 transmits a scan signal TX to the panel capacitor CP to charge the panel capacitor CP. In particular, the second circuit 220 transmits an inverting signal S1 to the capacitor C1, in which the inverting signal S1 is synchronized with the scan signal TX. Herein, "synchronized" means that when the scan signal TX changes its level, the inverting signal S1 changes its level at the same time. In addition, the frequency of the inverting signal S1 is identical to the frequency of the scan signal TX, and the inverting signal S1 is phase-inverted from the scan signal TX. In other words, when the scan signal TX is raised, the inverting signal S1 drops simultaneously; or, when the scan signal TX drops, the inverting signal S1 is raised simultaneously. As a result, when the panel capacitor CP is charged, the capacitor C1 decreases the quantity of the charges on the panel capacitor CP.

The controlling circuit 230 is coupled to the second terminal of the panel capacitor CP, and configured to output a touch signal 231 in response to the voltage at the second terminal of the panel capacitor CP. Due to a change of the capacitance of the panel capacitor CP, the voltage at the second terminal of the panel capacitor CP changes correspondingly. Because the touch signal 231 is generated in response to the voltage at the second terminal of the panel capacitor CP, the touch signal 231 can be used to estimate the capacitance of the panel capacitor CP. However, since the capacitor C1 decreases the quantity of the charges on the panel capacitor CP, the capacitance estimated by the touch signal 231 is smaller such that a base capacitance of the panel capacitor CP is equivalently decreased and a resolution requirement of the controlling circuit 230 is accordingly reduced.

In detail, assume the capacitance of the panel capacitor CP is $C_p$ when it is not touched, and the capacitance of the panel capacitor CP is $C_p+\Delta C$ when it is touched (i.e. $C_p$ is a base capacitance, and $\Delta C$ is a capacitance variance). Also assume that the voltage level of the scan signal TX is $V_x$ (also referred to a scan voltage level), the capacitance of the capacitor C1 is $C_1$ (also referred to a first capacitance), and the voltage level of the inverting signal S1 is $-V_1$ (also referred to an inverting voltage level). Therefore, the quantity of the charges on the panel capacitor CP when it is not touched is represented as the following formula (1), and the quantity of the charges on the panel capacitor CP when it is touched is represented as the following formula (2).

$$V_x \times C_p - V_1 \times C_1 \quad (1)$$

$$V_x \times (C_p + \Delta C) - V_1 \times C_1 \quad (2)$$

Then, the formula (1) is subtracted from the formula (2) to obtain $V_x \times \Delta C$ (not related to $C_1$), and therefore the capacitor C1 does not affect the estimation of the capacitance variance $\Delta C$.

The equivalently decreased capacitance is related to the product of $C_1$ and $V_1$. Notice that the capacitance of the capacitor C1 and the voltage level of the inverting signal S1 can be arbitrarily adjusted to equivalently decrease any quantity of the capacitance in the invention. For example, the capacitor C1 may be implemented as a variable capacitor. In general, the product of $V_1$ and $C_1$ is less than the product of $T_x$ and $C_p$. If $C_1$ and $V_1$ equivalently decrease 20 pF, the base capacitance $C_p$ is 21.4 pF, and the capacitance variance $\Delta C$ is 0.1 pF and quantized into 256 levels, then the controlling circuit 230 is required to recognize X levels, in which 256/X=0.1/1.4 (X=3584). That is, the controlling circuit 230 is required to have 12 bits of resolution.

Figure 3:
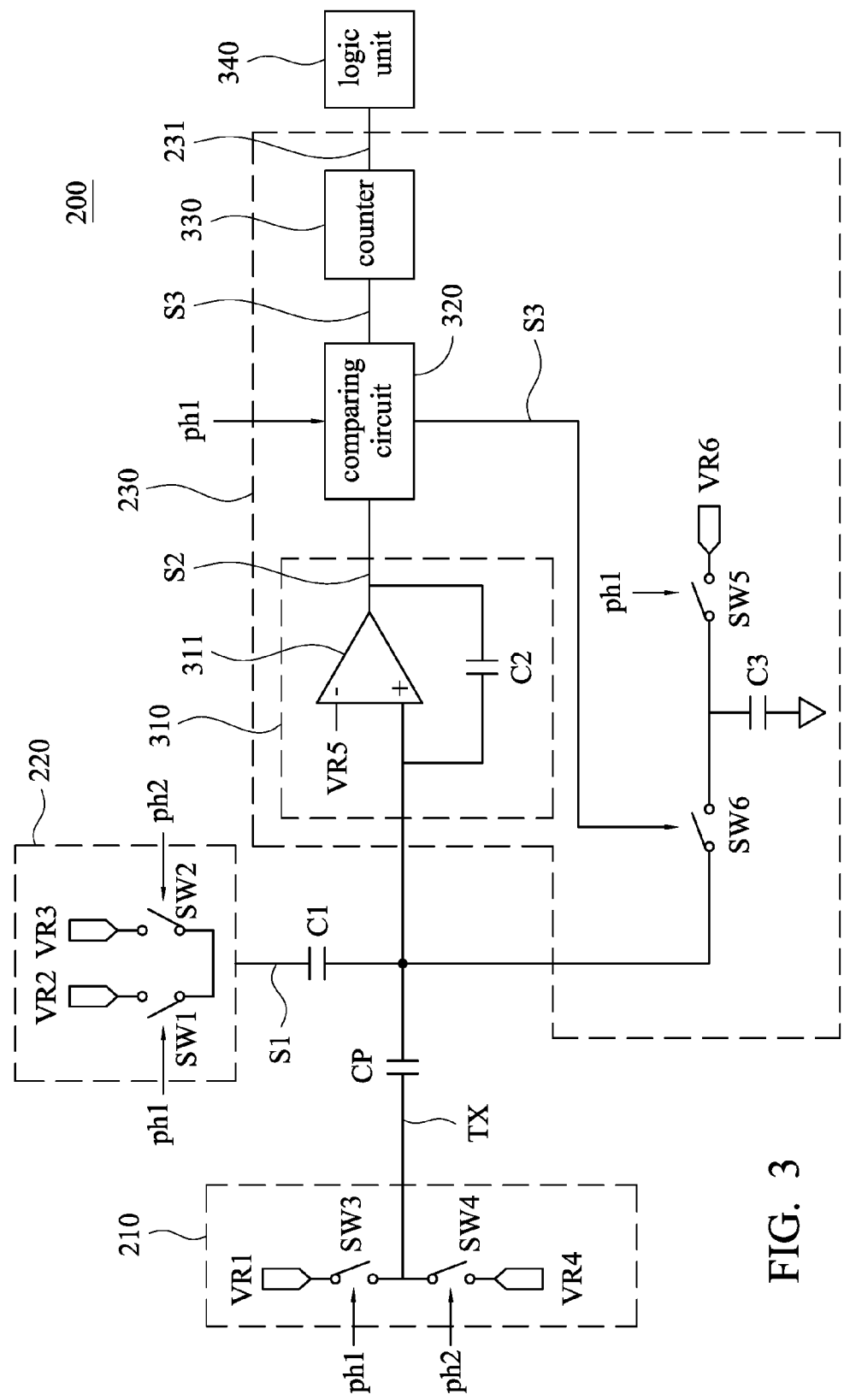
FIG. 3 is a circuit diagram illustrating the touch panel according to an embodiment.

FIG. 3 is a circuit diagram illustrating the touch panel according to an embodiment. Notice that FIG. 3 is just an example, and people skilled in the art can implement the first circuit 210, the second circuit 220 and the controlling circuit 230 in another way according to the disclosure above. The invention should not be limited thereto.

Figure 4:
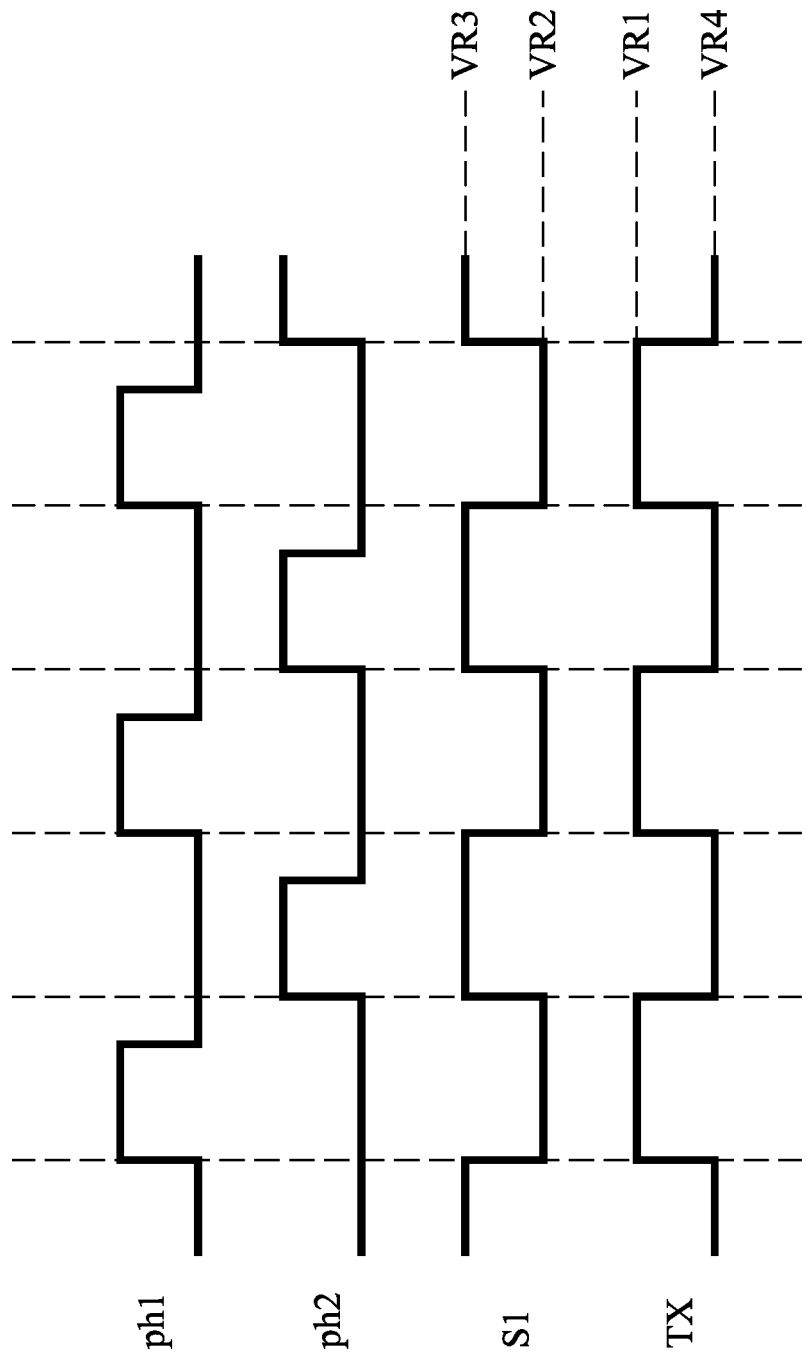
FIG. 4 is a timing diagram of signals according to an embodiment.

In the embodiment of FIG. 3, the second circuit 220 includes a first switch SW1 and a second switch SW2. A first terminal of the first switch SW1 and a first terminal of the second switch SW2 are coupled to the second terminal of the capacitor C1. A second terminal of the first switch SW1 is coupled to a second reference voltage VR2, and a second terminal of the second switch SW2 is coupled to a third reference voltage VR3. The first switch SW1 is controlled by a first phase signal ph1. The second switch SW2 is controlled by a second phase signal ph2. The first circuit 210 includes a third switch SW3 and a fourth switch SW4. A first terminal of the third switch SW3 is coupled to a first reference voltage VR1, and a second terminal of the third switch SW3 is coupled to the first terminal of the panel capacitor CP. The third switch SW3 is controlled by the first phase signal ph1. A first terminal of the fourth switch SW4 is coupled to a fourth reference voltage VR4, and a second terminal of the fourth switch SW4 is coupled to the first terminal of the panel capacitor CP. The fourth switch SW4 is controlled by the second phase signal ph2. The first phase signal ph1 is phase-inverted from the second phase signal ph2, and the first phase signal ph1 is not overlapped with the second phase signal ph2 (see an example shown in FIG. 4). In addition, the second reference voltage VR2 is lower than the third reference voltage VR3, and the fourth reference voltage VR4 is lower than the first reference voltage VR1. For example, first reference voltage VR1 is 6V (volts), the second reference voltage VR2 and the fourth reference voltage VR4 are 0 V, and the third reference voltage is 3V. In other words, in the embodiment of FIG. 3, the scan signal TX is a pulse signal (also referred to a first pulse signal), and the first circuit 210 raises the scan signal TX to the first reference voltage VR1 at a certain first time point. Besides, the inverting signal S1 is also a pulse signal (also referred to a second pulse signal), and the second circuit 220 controls the inverting signal S1 to drop to the second reference voltage VR2 at the same first time point. Therefore, the capacitor C1 can decrease the quantity of the charges on the panel capacitor CP.

In another embodiment, the reference voltages VR1 to VR4 may have any other voltage levels. In one embodiment, the reference voltages VR1 to VR4 can be set from 0V to 6V, but the invention is not limited thereto.

In the embodiment of FIG. 3, the controlling circuit 230 includes an integrator 310, a comparing circuit 320 and a counter 330. An input terminal of the integrator 310 is coupled to the second terminal of the panel capacitor CP, and an output terminal of the integrator 310 outputs an integrating signal S2. An input terminal of the comparing circuit 320 is coupled to the output terminal of the integrator 310, and is configured to determine if the integrating signal S2 is higher than a comparing voltage and output a comparing signal S3 according to the first phase signal ph1. In the embodiment, the integrator 310 integrates the voltage at the second terminal of the panel capacitor CP. The greater the capacitance of the panel capacitor CP is, the higher the voltage level of the integrating signal S2 is. In detail, the integrator 310 includes an operational amplifier 311 and a capacitor C2 (also referred to a second capacitor). A first input terminal (e.g. inverting terminal) of the operational amplifier 311 is coupled to a fifth reference voltage VR5 (e.g. 1.5V), and a second input terminal (e.g. non-inverting terminal) of the operational amplifier 311 is coupled to the second terminal of the panel capacitor CP. A first terminal of the capacitor C2 is coupled to the second terminal of the panel capacitor CP, and a second terminal of the capacitor C2 is coupled to the output terminal of the operational amplifier 311. If the integrating signal S2 is higher than the comparing voltage, then the comparing signal S3 is at a high (or low in another embodiment) voltage level, and the comparing circuit 320 outputs the comparing signal S3 only when the first phase signal ph1 is at a raising edge. For example, the comparing circuit 320 may include a comparator and a latch, but the invention is not limited thereto.

The controlling circuit 230 further includes a fifth switch SW5, a sixth switch SW6 and a capacitor C3 (also referred as a third capacitor). A first terminal of the fifth switch SW5 is coupled to a sixth reference voltage VR6 (e.g. 2V), and the fifth switch is controlled by the first phase signal ph1. A first terminal of the capacitor C3 is coupled to a ground terminal and a second terminal of the capacitor C3 is coupled to a second terminal of the fifth switch SW5. A first terminal of the sixth switch SW6 is coupled to the second terminal of the capacitor C2, and a second terminal of the sixth switch SW6 is coupled to the second terminal of the panel capacitor CP. The sixth switch SW6 is controlled by the comparing signal S3. When the sixth switch SW6 is on, the voltage level of the integrating signal S2 is decreased and may be lower than the comparing voltage.

The counter 330 is coupled to the comparing circuit 320, and is configured to count according to the comparing signal S3 to generate the touch signal 231. When the capacitance of the panel capacitor CP becomes larger, the times that the integrating signal S2 is higher than the comparing voltage are greater. The counter 330 counts the times that the integrating signal S2 is higher than the comparing voltage in a system period to output the touch signal 231. And then, the logical unit 340 estimates the capacitance of the panel capacitor CP according to the touch signal 231. The logical unit 340 can be implement as software or hardware, and the invention is not limited thereto.

Figure 5:
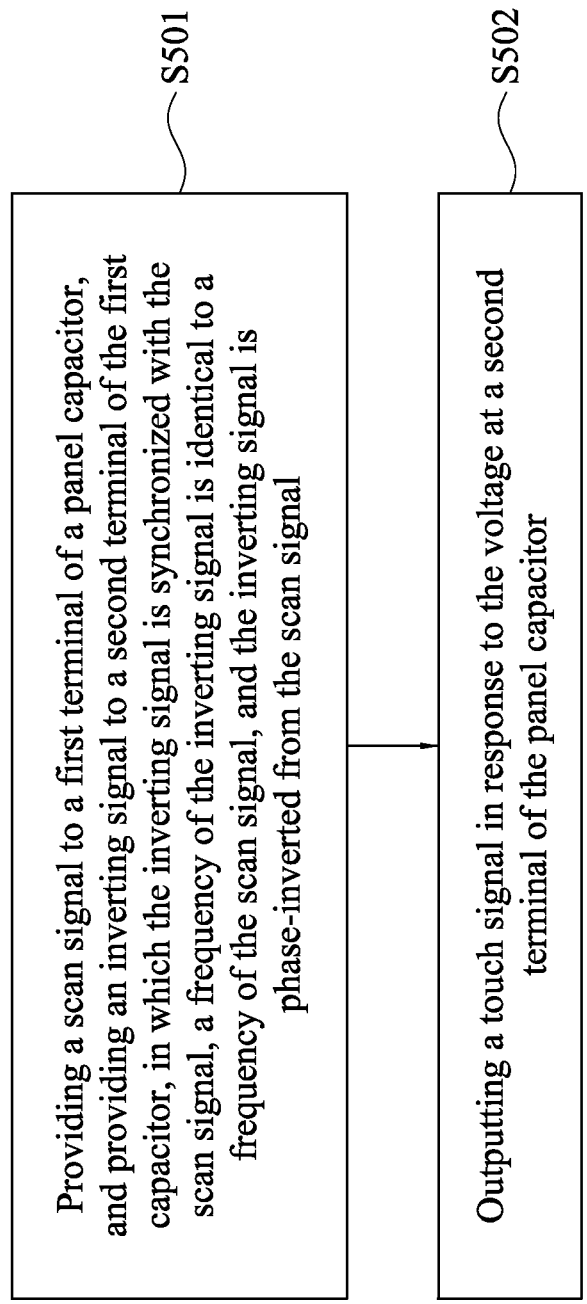
FIG. 5 is a flowchart of a controlling method for the touch panel according to an embodiment.

FIG. 5 is a flowchart of a controlling method for the touch panel according to an embodiment. In a step S501, a scan signal is provided to a first terminal of a panel capacitor, and an inverting signal is provided to a second terminal of the first capacitor, in which the inverting signal is synchronized with the scan signal, a frequency of the inverting signal is identical to a frequency of the scan signal, and the inverting signal is phase-inverted from the scan signal. In a step S502, a touch signal is outputted in response to the voltage at a second terminal of the panel capacitor. However, each step in FIG. 5 has been described above, and they will not be repeated.

In the controlling method and the touch panel provided in the embodiments of the invention, an inverting signal is provided to the capacitor C1 when the panel capacitor CP is charged. Therefore, the quantity of the charges on the panel capacitor CP is decreased and the base capacitance is equivalently decreased. As a result, a resolution requirement of the controlling circuit 230 can be reduced.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
   a panel capacitor;
   a first circuit coupled to a first terminal of the panel capacitor, and configured to transmit a scan signal to the panel capacitor;
   a first capacitor, wherein a first terminal of the first capacitor is coupled to a second terminal of the panel capacitor;
   a second circuit coupled to a second terminal of the first capacitor, and configured to transmit an inverting signal to the first capacitor, wherein the inverting signal is synchronized with the scan signal, a frequency of the inverting signal is identical to a frequency of the scan signal, and the inverting signal is phase-inverted from the scan signal; and
   a controlling circuit coupled to the second terminal of the panel capacitor, and configured to output a touch signal in response to a voltage at the second terminal of the panel capacitor, wherein the touch signal is configured to estimate a capacitance of the panel capacitor,
   wherein the scan signal is a first pulse signal, and the first circuit raises the first pulse signal to a first reference voltage at a first time point,
   wherein the inverting signal is a second pulse signal, the second circuit controls the second pulse signal to drop to a second reference voltage at the first time point, and the second reference voltage is lower than the first reference voltage.

2. The touch panel of claim 1, wherein the second circuit comprises:
   a first switch, wherein a first terminal of the first switch is coupled to the second terminal of the first capacitor, a second terminal of the first switch is coupled to the second reference voltage, and the first switch is controlled by a first phase signal; and
   a second switch, wherein a first terminal of the second switch is coupled to the second terminal of the first capacitor, a second terminal of the second switch is coupled to a third reference voltage, and the second switch is controlled by a second phase signal,
   wherein the second reference voltage is lower than the third reference voltage, the second phase signal is phase-inverted from the first phase signal, and the second phase signal is not overlapped with the first phase signal.

3. The touch panel of claim 2, wherein the first circuit comprises:
   a third switch, wherein a first terminal of the third switch is coupled to the first reference voltage, a second terminal of the third switch is coupled to the first terminal of the panel capacitor, and the third switch is controlled by the first phase signal; and
   a fourth switch, wherein a first terminal of the fourth switch is coupled to a fourth reference voltage, a second terminal of the fourth switch is coupled to the first terminal of the panel capacitor, and the fourth switch is controlled by the second phase signal,
   wherein the fourth reference voltage is lower than the first reference voltage.

4. The touch panel of claim 3, wherein the controlling circuit comprises:
   an integrator, wherein an input terminal of the integrator is coupled to the second terminal of the panel capacitor, and an output terminal of the integrator outputs an integrating signal;
   a comparing circuit, wherein an input terminal of the comparing circuit is coupled to the output terminal of the integrator, and the comparing circuit determines if the integrating signal is higher than a comparing voltage to output a comparing signal according to the first phase signal;
   a counter, coupled to the comparing circuit and configured to count according to the comparing signal to generate the touch signal.

5. The touch panel of claim 4, wherein the integrator comprises:
   an operational amplifier, wherein a first input terminal of the operational amplifier is coupled to a fifth reference voltage, and a second input terminal of the operational amplifier is coupled to the second terminal of the panel capacitor; and
   a second capacitor, wherein a first terminal of the second capacitor is coupled to the second terminal of the panel capacitor, and a second terminal of the second capacitor is coupled to an output terminal of the operational amplifier.

6. The touch panel of claim 5, wherein the controlling circuit further comprises:
   a fifth switch, wherein a first terminal of the fifth switch is coupled to a sixth reference voltage, and the fifth switch is controlled by the first phase signal;
   a third capacitor, wherein a first terminal of the third capacitor is coupled to a ground terminal, and a second terminal of the third capacitor is coupled to a second terminal of the fifth switch; and
   a sixth switch, wherein a first terminal of the sixth switch is coupled to the second terminal of the second capacitor, a second terminal of the sixth switch is coupled to the second terminal of the panel capacitor, and the sixth switch is controlled by the comparing signal.

7. The touch panel of claim 1, wherein the touch panel is an in-cell touch panel.

8. The touch panel of claim 1, wherein the scan signal has a scan voltage level, the inverting signal has an inverting voltage level, the panel capacitor has a base capacitance, the first capacitor has a first capacitance, and a product of the inverting voltage level and the first capacitance is less than a product of the scan voltage level and the base capacitance.

9. A controlling method for a touch panel, wherein the touch panel comprises a panel capacitor and a first capacitor, and the controlling method comprises:
   providing a scan signal to a first terminal of the panel capacitor, wherein a second terminal of the panel capacitor is coupled to a first terminal of the first capacitor;
   providing an inverting signal to a second terminal of the first capacitor, wherein the inverting signal is synchronized with the scan signal, a frequency of the inverting signal is identical to a frequency of the scan signal, and the inverting signal is phase-inverted from the scan signal; and
   outputting a touch signal in response to a voltage at the second terminal of the panel capacitor, wherein the touch signal is configured to estimate a capacitance of the panel capacitor,
   wherein the scan signal is a first pulse signal, the inverting signal is a second pulse signal, and the controlling method further comprises:
   raising the first pulse signal to a first reference voltage at a first time point; and controlling the second pulse signal to drop to a second reference voltage at the first time point, wherein the second reference voltage is lower than the first reference voltage.

10. The controlling method of claim 9, wherein the scan signal has a scan voltage level, the inverting signal has an inverting voltage level, the panel capacitor has a base capacitance, the first capacitor has a first capacitance, and a product of the inverting voltage level and the first capacitance is less than a product of the scan voltage level and the base capacitance.

* * * * *